L. B. WYGANT.
BLOCK PLACER FOR BALING PRESSES.
APPLICATION FILED DEC. 2, 1912.
1,073,382.
Patented Sept. 16, 1913.
2 SHEETS—SHEET 1.
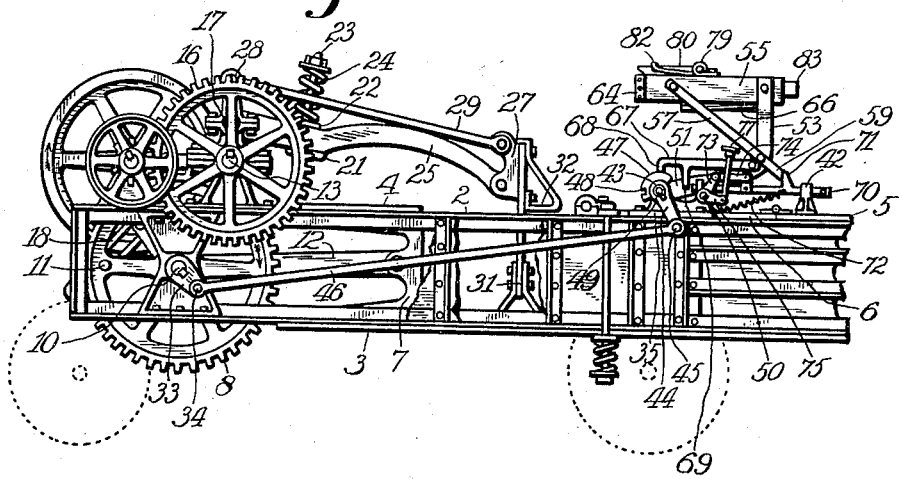
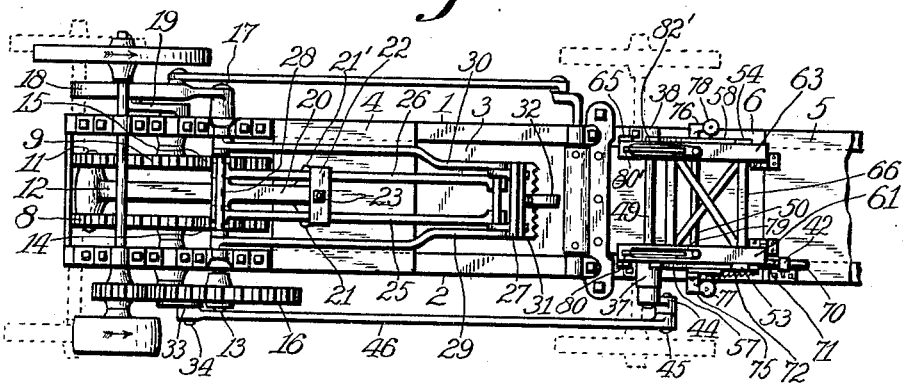
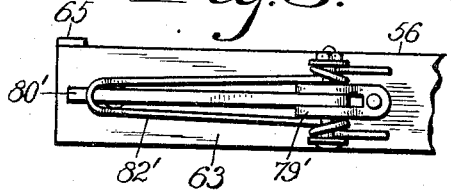
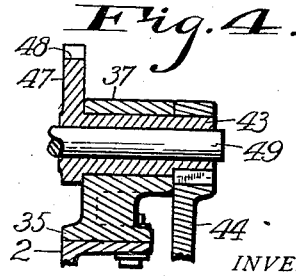
WITNESSES:
J. H. Gardner
M. J. Messenheimer
INVENTOR:
Lewis B. Wygant,
BY
E. T. Silvius,
ATTORNEY.

L. B. WYGANT.
BLOCK PLACER FOR BALING PRESSES.
APPLICATION FILED DEC. 2, 1912.

1,073,382.

Patented Sept. 16, 1913.

2 SHEETS—SHEET 2.

WITNESSES:
J. H. Gardner
M. J. Messenheimer

INVENTOR:
Lewis B. Wygant,
BY
E. T. Silvius,
ATTORNEY.

UNITED STATES PATENT OFFICE.

LEWIS B. WYGANT, OF VINCENNES, INDIANA.

BLOCK-PLACER FOR BALING-PRESSES.

1,073,382.  Specification of Letters Patent.  Patented Sept. 16, 1913.

Application filed December 2, 1912. Serial No. 734,595.

*To all whom it may concern:*

Be it known that I, LEWIS B. WYGANT, a citizen of the United States, residing at Vincennes, in the county of Knox and State of Indiana, have invented a new and useful Block-Placer for Baling-Presses, of which the following is a specification, reference being had to the accompanying drawings and to the letters and figures of reference marked thereon.

This invention relates to the type of baling press that is designed to form bale after bale of hay or other substance with division blocks between the bales while being formed, the invention having reference more particularly to apparatus for carrying and placing the blocks in the required position for dropping them into the baling chamber of the press.

The object of the invention is to provide an improved block placer for baling presses of such construction as to be adapted to be produced at relatively small cost and be strong and reliable in operation, and which shall be adapted to be constructed of such material as will not be liable to become fractured in use.

A further object is to provide operating means, for placing the blocks, that shall be so constructed as to not require close attention of the attendant.

A still further object is to provide an improved block placer and operating means therefor of such construction as to be particularly adapted to be applied to the baling press forming the subject matter of my pending application for Letters Patent of the United States, Serial Number 664,250, filed December 6, 1911.

The invention consists in an improved block holder, and means for connecting the holder at will with operating mechanism of a baling press to tilt the holder for dropping a block; the invention consisting further and more specifically in certain novel features of construction and in the parts and combinations and arrangements of parts as hereinafter particularly described and claimed.

Figure 5:
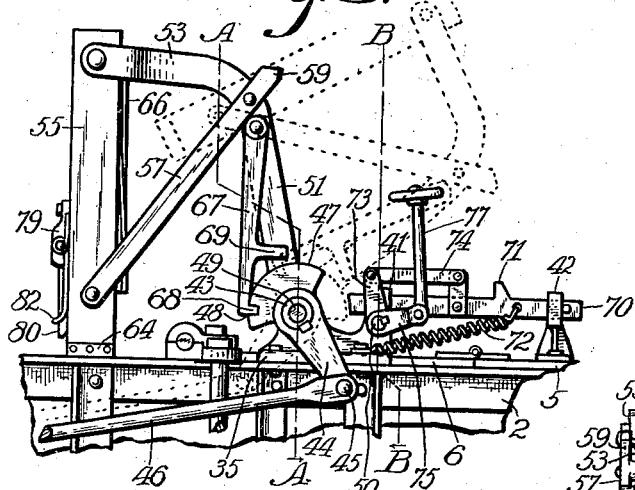
Figure 6:
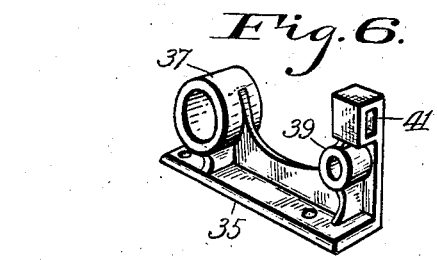
Figure 7:
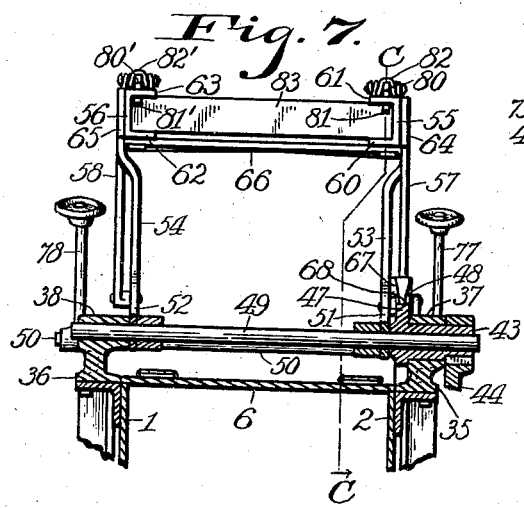
Figure 8:
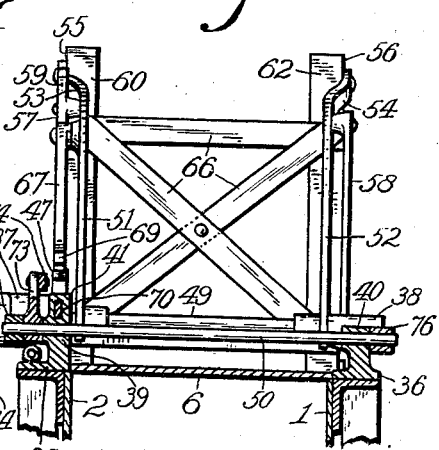
Figure 9:
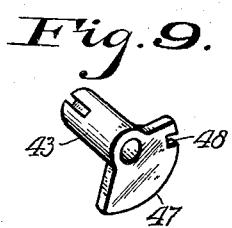
Figure 10:
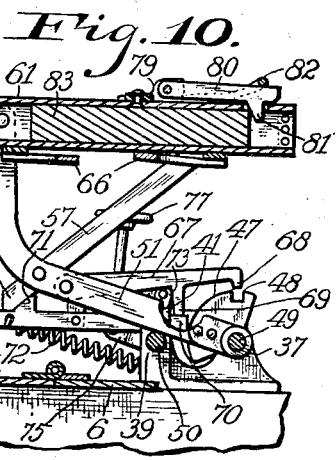

Referring to the drawings, Figure 1 is a fragmentary side elevation of a baling press similar to that described in said application for Letters Patent and having the improved block placer applied thereto; Fig. 2, a top plan of the preceding figure; Fig. 3, a top plan of a portion of the block holder; Fig. 4, a fragmentary sectional detail of portions of the improved block placer; Fig. 5, a side elevation of the block placer in position for dropping a block; Fig. 6, a perspective view of one of the supporting parts of the block placer; Fig. 7, a transverse section approximately on the line A A in Fig. 5 with the apparatus in the position shown in Fig. 1; Fig. 8, a transverse section approximately on the line B B in Fig. 5; Fig. 9, a perspective view of one of the parts of the improved operating mechanism; and Fig. 10, a fragmentary section approximately on the line C C in Fig. 7.

In the different figures of the drawings similar reference characters indicate like elements or features of construction herein referred to.

The construction and mode of operation of the improved block placer may be best understood by reference to certain parts of the baling press above referred to and reproduced in the accompanying drawings and hereinafter referred to, said baling press comprising two suitable sides 1 and 2, a bottom 3 secured to the sides, a top plate 4 on one end portion of the sides, a top plate 5 on the opposite or rearward end portion of the sides, an upwardly yielding plate 6 hinged to the plate 5, with space between the plates 4 and 6 into which to feed the substance to be baled in the baling chamber, and also to receive the division blocks. A rammer 7 is suitably guided in the baling chamber for pressing the substance into compact form. Two gear wheels 8 and 9 provided each with an axial shaft 10 are mounted in the two sides respectively and are connected together by a crank pin 11 to which is connected a pitman 12 that is connected to the rammer. A shaft 13 is rotatably mounted upon the sides of the press frame and has two pinions 14 and 15 secured thereto that are in mesh with and drive the gear wheels 8 and 9 respectively, the shaft 13 having also a gear wheel 16 secured thereto which may be suitably driven. A rock shaft 17 is suitably mounted above the shaft 13 and it has a slotted arm 18 thereon which is oscillated by a crank 19 on the shaft of the wheel 9.

A packer or feeder is employed and as illustrated comprises a rocker arm 20 secured to the rock shaft 17 and it is provided with two laterally extending lugs 21 and 21′ at the under side thereof. A cross bar 110

22 is placed upon the upper side of the rocker arm, a lug bolt 23 being securely connected with the rocker arm and extending upward through the cross bar and also through a coil spring 24 that is seated upon the cross bar and suitably placed under tension in connection with the bolt. Two feeder arms 25 and 26 are rotatably mounted on the rock shaft 17 at opposite sides of the rocker arm and normally rest upon the lugs 21 and 21′ in contact with the cross bar 22. A feeder head 27 is pivotally connected with the arms 25 and 26. A pivot rod 28 is supported above the rock shaft 17, two rods 29 and 30 being connected to the pivot rod and pivotally connected to the head 27, the head having an arm 31 thereon that operates vertically into and out of the baling chamber, and the head 27 is provided with a projection 32 for pushing the division blocks out of the block holder and into the baling chamber. A crank arm 33 is secured to the shaft 10 and has a crank pin 34 thereon, the crank arm being at the outer side of one of the sides of the press frame. It will be understood that a platform, not illustrated, is commonly employed for holding a quantity of loose hay or other substance to be baled and on which the operator may stand to feed the substance into the baling chamber.

In practically carrying out the objects of the invention, two base members 35 and 36 are provided respectively with journal boxes 37 and 38 on one end and also journal boxes 39 and 40 on the opposite end thereof, the journal box 37 being larger than the others in diameter, and the member 35 has a guide 41 thereon above the journal box 39. The members 35 and 36 are secured upon the sides 2 and 1 respectively at a suitable distance rearward of the forward end of the plate 6, and a guide 42 is mounted upon the side 2 in alinement with the guide 41 at a suitable distance rearward from the latter. A sleeve 43 is rotatably mounted in the larger journal box 37 and one end thereof has an arm 44 secured thereto that extends downwardly and is provided with a wrist pin 45 to which a connecting rod 46 is connected, the latter being connected to the crank pin 34, so that when the crank arm 33 is carried about the shaft 10 the arm 44 swings to and fro. The opposite end of the sleeve 43 has a curved segmental guide 47 thereon that extends upwardly, and the face of the guide has a notch or recess 48 therein. A main shaft 49 is supported in the sleeve 43 and in the journal box 38, a tumbling shaft 50 being journaled in the journal boxes 39 and 40. Two block holder arms 51 and 52 are supported at one end on the shaft 49 and when at rest extend over and are supported on the tumbling shaft 50, the arms having oblique angled end portions 53 and 54 that extend upward when at rest. Two guide plates 55 and 56 are secured at one end portion to the ends of the portions 53 and 54 respectively and when at rest extend forward horizontally, and two braces 57 and 58 are secured to the arms and also to the forward portions of the plates respectively, one brace 57 having a projection 59 thereon that extends beyond the arm 51. The plate 55 has a bottom guide 60 and a top guide 61, the plate 56 having a bottom guide 62 and a top guide 63 extending inwardly toward the guides of the opposite plate for holding the block. The outer sides of the forward ends of the plates 55 and 56 have blocks 64 and 65 secured thereto respectively that rest upon the sides 2 and 1 respectively of the press frame when the holder is in position to drop a block and preferably are formed of wood so as to serve as buffers. The holder guides are connected together by means of suitable cross bars 66. A link bar 67 is pivotally connected at one end to the arm 51 and has a lug 68 on its opposite end that is adapted to ride on the guide 47 and also to drop into the notch 48 for moving the block holder when required, the bar 67 having also a downwardly extending projection 69 thereon for preventing the lug from entering the notch when it is desired that the block holder remain at rest. A slide bar 70 is mounted horizontally in the guides 41 and 42 and has an upwardly extending finger or tooth 71 thereon that is inclined at its rearward side, its forward side being drawn against the projection 59 by means of a spring 72 connected to the bar and also to the member 35, in which position the bar 70 is held back so as to permit the lug 68 to rest upon the guide 47, but when the block holder is tilted forward so that the bar 70 is released the latter is spring pressed forward so as to be brought under the projection 69 and force the lug 68 out of the notch 48 and hold the lug clear of the guide 47 while the block holder is at rest position, and the projection 59 then extends behind the tooth 71, the tooth being adapted to force the projection 59 over it to the position shown in Fig. 1 in order to hold the bar 70 in retracted position and permit the lug 68 to rest upon the guide 47 from which it may drop into the notch 48 when the notch is brought under the lug. The shaft 50 has an arm 73 secured thereto to which a link 74 is pivoted, the link being suitably connected to the bar 70, and two arms 75 and 76 are secured also to the shaft 50 and are provided respectively with treadles 77 and 78 so that the attendant who may be at either side of the block holder may conveniently retract the slide bar 70.

In order to prevent the blocks from prematurely sliding out of the block holder when the latter is tilted forward, two hinge members 79 and 79' are secured to the upper sides of the guides 61 and 63 respectively, two arms 80 and 81 being pivoted at one end to the hinge members respectively and provided on the under side of the free end portions with fingers 81 and 81' respectively that extend through the guides 61 and 63, the rearward sides of the fingers being beveled so that they may be forced outwardly by the lower end of the block but are forced inwardly by springs 82 and 82' respectively that are suitably supported, so that the fingers prevent the blocks from sliding down from the guides until forced downward.

It should be understood that the shaft 49 may be fixedly secured in the sleeve 43 and rotatively supported in the box 38, the arms 51 and 52 being loose on the shaft; or the arms may be fixedly secured to the shaft and the shaft rotatively mounted in the sleeve, so that the block holder is supported to move pivotally. Various other modifications obviously may be made within the scope of the accompanying claims.

In practical use the hay or other substance is fed by an attendant into the opening or hopper in the top of the baling chamber while the rammer and the feeder are in retracted position, and when a sufficient quantity of a substance has been pressed into the baling chamber to form a bale the attendant operates the tumbling shaft 50 so as to retract the slide bar 70 and place the link 67 in proper position which permits the lug 68 to drop into the notch 48 when the latter is carried back to the lug. The arm 44, being operated continuously, it will be clear that when the lug enters the notch the link 67 tilts the block holder with a division block 83 therein until the holder is stopped in vertical position on the frame. The gearing is calculated to time the movement of the head 27 so that when the block is in position to be dropped it is forced down into the baling chamber by the projection 32, and the block holder is tilted back again to its normal rest position, when the projection 69 comes into contact with the projected bar 70 and forces the lug 68 out of the notch 48, thus disconnecting the block holder and permitting the guide 47 to idly rock to and fro until another division block is required to be placed. Other results of the operation of the improvement will be readily understood from the foregoing description of the construction and function of the several parts thereof.

Having thus described the invention, what is claimed as new is:

1. A block placer including a pivotally movable block holder provided with a movable lug, a curved rocking guide for guiding the lug and having a recess therein to receive the lug for moving the holder, and controllable movable means for holding the lug away from the guide.

2. A block placer including a pivotal shaft having a rocking guide thereon provided with an engagement device, a block holder mounted on the shaft to move pivotally and provided with a lug device adapted for locking connection with the engagement device to periodically move the holder, and a controllable element for controlling the connection of the lug device with the engagement device.

3. A block placer including a pivotal shaft having a curved guide thereon provided with a recess, an operating arm for rocking the guide, a block holder mounted on the shaft to move pivotally and provided with a movable lug to enter the recess for moving the holder, and a controllable element for controlling the entrance of the lug into and egress from the recess.

4. A block placer including a pivoted block holder, a movably supported bar, a spring normally holding the bar in projected position, a curved guide rotatably supported and having a recess therein, and a link bar pivoted to the block holder and having a lug thereon for entering the recess to move the holder, the link bar normally resting on the movably supported bar and holding the lug away from the guide.

5. A block placer including a supported pivotal shaft, a supported tumbling shaft having an arm thereon, a slide bar movably guided and operatively connected with the arm, a block holder movably mounted on the pivotal shaft and normally resting on the tumbling shaft, a supported rocking element, and means for clutching the block holder to the rocking element controlled by the slide bar.

6. A block placer including a journal box, a sleeve rotatively mounted in the box and having an operating arm on one end and a curved guide on the opposite end thereof, the face of the guide having a recess therein, a shaft supported at one end in the sleeve, a box supporting the opposite end of the shaft, a block holder mounted on the shaft to move pivotally, and a link bar pivoted to the holder and having a lug thereon to enter the recess for moving the holder.

7. In a block placer, the combination with a supported shaft, of a block holder and a curved guide mounted to rock on the axis of the shaft, the guide having a recess therein, means for rocking the guide, a slide bar movably guided and having a finger thereon, a device on the block holder normally engaging the finger to hold the slide bar in retracted position, a spring coöperating with the slide bar for holding the latter in projected position, and a link bar pivoted to the block holder and having a lug and also a projection thereon, the projection normally resting on the projected slide bar and holding the lug from the curved guide, the slide bar when retracted permitting the lug to rest upon the rocking guide and enter the recess for moving the block holder.

8. In a block placer, the combination of a supported tumbling shaft having an arm thereon, a slide bar movably guided and operatively connected with the arm, the bar having a finger thereon, two operating arms secured to the tumbling shaft, a supported main shaft, a block holder and a curved guide mounted to rock on the axis of the main shaft, the holder normally resting on the tumbling shaft, the guide having a recess therein, means for rocking the guide, a link bar pivoted to the block holder and having a lug thereon to rest on the rocking guide and drop into the recess for rocking the holder, the link bar normally resting on the slide bar, and a device on the block holder engaging either side of the finger for holding the slide bar in either one of two positions for controlling the action of the lug.

9. In a block placer, the combination with a press frame, a rammer movably mounted in the frame, gearing for moving the rammer, and a crank arm rotated by the gearing, of a pivotal shaft and a tumbling shaft mounted on the frame, two guides supported on the frame, a block holder and a curved guide mounted to rock on the axis of the pivotal shaft, the holder normally resting upon the tumbling shaft, the guide having a recess therein and provided with an operating arm, a link bar pivoted on the block holder and having a lug thereon for entering the recess to rock the block holder, a slide bar having a finger and guided by the two guides and movable toward or from the curved guide, a spring connected to the press frame and the slide bar for projecting the latter under the link bar for holding the lug from the curved bar, a lock device fixed to the block holder engaging one side of the finger to hold the slide bar in retracted position and forced out of the way when the bar is retracted, means for retracting the slide bar, and a rod connected to the operating arm and to the crank arm.

In testimony whereof, I affix my signature in presence of two witnesses.

LEWIS B. WYGANT.

Witnesses:
  CARRIE O. DOREY,
  HERBERT F. JONES.

---

Copies of this patent may be obtained for five cents each, by addressing the "Commissioner of Patents, Washington, D. C."